United States Patent [19]

Evans et al.

[11] Patent Number: 4,933,409

[45] Date of Patent: *Jun. 12, 1990

[54] LIGHT COLOR, LOW SOFTENING POINT HYDROCARBON RESINS

[75] Inventors: Morris L. Evans; Steven G. Hentges, both of Baton Rouge, La.

[73] Assignee: Exxon Chemical Patents Inc., Linden, N.J.

[*] Notice: The portion of the term of this patent subsequent to Jun. 30, 2004 has been disclaimed.

[21] Appl. No.: 68,592

[22] Filed: Jun. 30, 1987

Related U.S. Application Data

[63] Continuation-in-part of Ser. No. 830,409, Feb. 18, 1986, Pat. No. 4,677,176.

[51] Int. Cl.$^5$ ............................................. C08F 36/04
[52] U.S. Cl. ..................................... 526/290; 526/76; 526/237; 525/241
[58] Field of Search ................. 526/76, 237, 290, 339, 526/340; 525/241; 327.9; 156/334

[56] References Cited

U.S. PATENT DOCUMENTS

| | | | |
|---|---|---|---|
| 3,784,530 | 1/1975 | Osborn et al. | 526/339 X |
| 3,865,797 | 2/1975 | Joy | 526/237 X |
| 4,078,132 | 3/1978 | Lepert | 526/76 |
| 4,230,842 | 10/1980 | Bullard et al. | 526/185 |
| 4,677,176 | 6/1987 | Evans et al. | 526/290 |
| 4,766,169 | 8/1988 | Lepert et al. | 526/290 X |

*Primary Examiner*—Joseph L. Schofer
*Assistant Examiner*—F. M. Teskin
*Attorney, Agent, or Firm*—J. F. Hunt

[57] ABSTRACT

A light color optionally hydrogenated petroleum hydrocarbon resin including an aromatic hydrocarbon component useful for tackifying block copolymers is described which has a softening point of about 0° C. to about 40° C., a number average molecular weight (Mn) of from 350 to 600 and a molecular weight distribution (Mw/Mn) of from 1:1 to about 2.0.

10 Claims, No Drawings

LIGHT COLOR, LOW SOFTENING POINT HYDROCARBON RESINS

CROSS REFERENCE

This application is a continuation-in-part of U.S. patent application Ser. No. 830,409, filed Feb. 18, 1986 now U.S. Pat. No. 4,677,176.

This invention relates to a hydrocarbon resin having excellent tackifying properties in adhesives. More particularly, it relates to a hydrocarbon resin having aromatic components with light color and a softening point of about 0° C. to about 40° C.

BACKGROUND OF THE INVENTION

Adhesives form a large part of daily activity for everyone, whether in the form of tape used to close a package or secure items together, bandages, envelopes, notepads, diaper tabs or any one of many other products in common use. The key requirements for adhesives are that they should have suitable cohesive and adhesive properties at end use conditions and during application, whether by solvent or bulk casting. Usually these adhesives are prepared from a mixture of resin, copolymer and a plasticizer to soften the adhesive and enhance tack.

Adhesives prepared from blends incorporating these polymers have very good adhesive and strength properties at room temperature and can be processed by conventional melt coating and extrusion techniques because of their good flow characteristics. Because of the excellent combination of properties exhibited by certain copolymers of a diolefin or an olefin and styrene, the use of such polymers for various pressure sensitive adhesive applications is growing in the industry.

Copolymers made from polystyrene and a diolefin are widely used in the production of adhesives such as, for example, styrene/isoprene/styrene (SIS), styrene/butadiene/styrene (SBS), and styrene/ethylene/butylene/styrene (SEBS), and the like. All of these copolymers whether formed by polymerization of polymer block or by random polymerization, are blended with tackifying resins in order to form the adhesive.

However, when copolymers are mixed with tackifying resins in order to form adhesives, many requirements and factors are important such as the ease with which the resin is blended with the copolymer and the control of the tack as well as the long term properties of the adhesive. Further, the adhesives industry has increased the demand for low softening point resins and market requirements dictate the desirability of resins which are not only liquid, i.e., softening point about 40° C. or less, but that are light in color, even a Gardner color of less than about 3. However, a resin would be considered to be sufficiently light in color for some applications with a Gardner color of 6 or even 7.

Many attempts have been made to prepare resins having these properties for use in the blending with copolymers to form adhesives, but all have fallen short of the mark in one respect or another. While other attempts have been made to prepare light color, low softening point resins such as those described in, for example, U.S. Pat. Nos. 3,963,653; 3,931,125; 3,574,792 and 4,078,132, most attempts have been centered around the preparation of aliphatic resins of the type described, for example, in U.S. Pat. Nos. 3,813,357; 3,692,756; 3,661,870; 3,804,788; 3,853,826; 3,872,064; 3,098,983 and 4,153,771. Unfortunately, aliphatic resins do not provide desired adhesive properties with many copolymers. Other components are required, usually an oil such as a naphthenic oil for example, to impart the tack or other requisite adhesive properties to the adhesive. The presence of the oil itself can cause detrimental adhesive performance. The liquid resins containing aromatic components solve these problems.

Prior attempts to incorporate aromaticity into the resin have generally caused an unacceptable high color level to result, thus making the resulting adhesive unsuitable for various uses.

Accordingly, it is an object of this invention to provide a low softening point hydrocarbon resin; i.e., from 0° C. to about 40° C.

It is a further object of this invention to provide a low softening point resin having a light color while including aromatic substituents to enhance adhesive properties.

Non-aliphatic resins having very low color exist even to the point of being water white. To use these resins to blend with some copolymers to form pressure sensitive adhesives, resins containing some aromaticity and light color, are desired. The presence of an oil plasticizer can cause detrimental results to substrates to which the adhesive is applied. Attempts to incorporate aromaticity, and thus compatibility with the styrene portion of copolymers, into the resin have generally caused an unacceptably high color level making the resulting adhesive unsuitable for various uses.

Accordingly, it is an object of this invention to provide a pressure sensitive adhesive incorporating a low softening point, from 0° C. to about 40° C., and light color aromatic-containing hydrocarbon resin.

It is a further object of this invention to provide adhesives in a binary or tertiary system of a copolymer and a low softening point resin having a light color even while including aromatic substituents to enhance adhesive properties.

SUMMARY OF THE INVENTION

We have discovered a light color, low softening point resin polymerized in a Friedel Crafts reaction from a feed stock comprising: (a) from about 5% to about 75% by weight of $C_8$ to $C_{10}$ vinyl aromatic hydrocarbon stream; (b) up to about 35% by weight of a piperylene stream; and (c) from about 25% to about 70% by weight of a stream containing $C_4$ to $C_8$ monoolefin chain transfer agents of the formula $RR'C=CR''R'''$ where R and R' are $C_1$ to $C_5$ alkyl, R'' and R''' are independently selected from H and a $C_1$ to $C_4$ alkyl group. The resins have a weight average molecular weight (Mw) of 110 to about 1600, a number average molecular weight (Mn) of 100 to 600, a (Mw)/(Mn) ratio of from 1.1 to about 2.7, and a softening point of from 0° C. to about 40° C. The resin can be blended with copolymers to provide useful adhesive compositions. The molecular weights are measured by a gel permeation chromatograph using a polyisobutylene standard and appear as mono-modal peaks on the chromatograph chart.

Thus, in accordance with this invention there is provided a hydrocarbon resin containing a major proportion of the catalyzed polymerizate having a number average molecular weight (Mn) of from 100 to 600, a weight average molecular weight (Mw) of from about 110 to about 1600, a Mw/Mn ratio of 1.1 to 2.7 and a softening point ranging from 0° C. to 40° C. The color of the resins of this invention range from less than about 1 to about 7 on the well known Gardner scale even though the finished resin has a vinyl aromatic content of from about 10 weight percent to about 60 weight percent.

The resin of this invention is attractive and functional for use in adhesives since it has both a low softening point and light color in addition to good tack and high compatibility with ethylene vinyl acetate (28-40% vinyl acetate) and other copolymers, both block and random. Heretofore, such a resin was not available.

The resin described above has been found to be compatible and produce good pressure sensitive adhesives, with many copolymers such as, for example, styrene/isoprene/styrene (SIS), polyethylene vinyl acetate (EVA), styrene/butadiene/styrene (SBS), and styrene/ethylene/butylene/styrene (SEBS), and the like. Generally, to prepare the adhesives of this invention, the copolymer is mixed with from about 20% to about 80% by weight of the resin with the copolymer being, correspondingly, about 80% by weight to about 20% by weight of the resin and the balance being optional components as hereinafter mentioned even though such optional materials are well recognized. These proportions will vary according to the copolymer involved, and the requirements of that copolymer to provide an adequate adhesive. As optional components, fillers and a hard resin having a softening point of about 80° C. or higher can be added in amounts of from 0 to 60% by weight in order to impart additional strength to the final adhesive. Examples of such hard resins could be aliphatic resins, aliphatic/aromatic resins, aromatic resins, terpene resins, terpene aliphatic resins, rosins, rosin derivatives and hydrogenated derivatives of the foregoing resins, and the like. These resins are well known to those skilled in preparing adhesives.

Detailed Description of the Invention

In practicing this invention to produce the novel, usually petroleum resins which have been found to provide tackification in many copolymer blends, the feedstock composition is important to obtain resins possessing requisite molecular weight and distribution, softening point and preferred color for a particular use. While the reaction conditions are also important, they may be varied somewhat.

The resin of this invention, having a softening point from 0° C. to about 40° C., and preferably from about 15° C. to about 30° C. and a color less than about a Gardner color of 7 (determined in a 50/50 solution with toluene) and preferably less than 5, most preferably a Gardner color less than about 2, is formed from a feed containing a $C_8$ to $C_{10}$ vinyl aromatic hydrocarbon stream, a heart cut distillate stream from steam cracked aromatic hydrocarbons having a boiling point range of from about 80° C. to about 260° C. or, preferably, pure styrene monomer, substituted styrene monomers, or mixtures thereof, present in amounts of from about 5% to about 75% by weight and preferably from about 5% to about 50% by weight of the polymerization feed, for pressure sensitive adhesive use preferably about 10% to about 40% by weight of the polymerization feed.

Preferable ranges of the vinyl aromatic component depend largely upon the end use involved and the desired properties of the resins. As noted above, color depends, at least in part, on the purity of the aromatic stream. Thus, preferred applications where light color is needed dictate that fewer impurities be present in the vinyl aromatic hydrocarbon stream even though the impurities are also hydrocarbons which act as a diluent in the reaction mixture and are removed after the resin is formed. When a resin having a softening point of from 15° C. to about 30° C. and a Gardner color of about 2 or less is desired, the preferred range of the vinyl aromatic component in the finished resin would be from about 10 to about 60 weight percent. The vinyl aromatic monomer content of the feed to achieve this aromatic content in the resin is from about 5 to about 50 parts by weight in the feed.

Optionally included as the second component is up to about 35% by weight, preferably from about 10% to about 26% and most preferably from about 12% to about 16% by weight, of a piperylene concentrate resulting from the isolation of a fraction of steam cracked petroleum hydrocarbons which boils between about 20° C. to about 140° C., said fraction containing diolefins being substantially below the nine carbon atom level. Preferably, piperylene concentrates have long been used in the preparation of resins along with the $C_5$ or $C_6$ olefins or diolefins, or mixtures thereof. Preferably, such fraction is heat soaked as is well known and described in U.S. Pat. No. 4,391,961, such disclosure being incorporated herein by reference for all purposes. The piperylene concentrate hereinafter sometimes referred to as heat soaked piperylenes, when incorporated into the resin of this invention, imparts a lower color to the resulting resin. While the piperylene concentrate can be used without heat soaking to produce the low softening point resin, a heat soaking step improves color. Piperylene concentrates, as will be shown later, contain hydrocarbons which do not enter into the resin-forming reaction. The presence of unreactive materials normally do no harm to the resin and, during reaction, act as a diluent to be removed when the resin is recovered.

The other component of the resin feed stream is a chain transfer agent comprising a stream containing $C_4$ to $C_8$ monoolefin chain transfer agents of the general formula $RR'C=CR''R'''$ where R and R' are $C_1$ to $C_5$ alkyl, R'' and R''' are independently selected from H and $C_1$ to $C_4$ alkyl group. Useful chain transfer agents are, for example, isobutene, isoamylenes, isohexenes and diisobutenes. The isoamylenes particularly useful are described in U.S. Pat. No. 4,514,554, disclosure of which is incorporated by reference herein for all purposes. These are usually concentrates, or mixtures, containing the various isomers desired from distillation cuts, well known to those skilled in the art, as well as mixtures made from pure compounds.

Particularly useful as the chain transfer agent to prepare the resin of the instant invention is the mixture containing isohexene isomers resulting from the dimerization of propylene in the well known "Dimersol" process using a nickel coordination complex and an aluminum alkyl as catalyst. The process can convert propylene to hexenes with selectivity in excess of 85%. The Dimersol ® dimerization process has been referred to in various publications, e.g., see "How First Dimersol is Working" by Benedek et al., Hydrocarbon Processing, May 1980, page 143; also Chauvin et al., "The IFP Dimersol ® Process for the Dimerization of $C_3$ and $C_4$ Olefinic Cuts", Advances in Petrochemical Technology, presented at American Institute of Chemical Engineers, Apr. 13, 1976, Kansas City, Mo.

While it is known that the pure compounds and isomers making up the aforementioned $C_4$ to $C_8$ monoolefin chain transfer agent streams are useful chain transfer agents, it is within the scope of the present invention to use mixtures of isomers and reaction products containing such isomers, in the practice of this invention, with the isohexenes produced by the "Dimersol" dimerzation process being preferred.

Hexenes, as produced by dimerization of propylene with transition metal catalyst, as in the Dimersol® dimerization process, are characterized by being composed mainly of internal olefins, and a linear content which has a range from about 20% up to 32% or so by weight. The main isomer present is a 2-methyl-2-penene, along with other 2- and 4-methyl pentenes and around 6% 2,3-dimethyl-2-butene. Some $C_9$ trimer, about 15% is also produced in the process. While it is not necessary to separate the $C_9$ trimer from the isohexene mix in the practice of this invention, it is preferred.

The chain transfer agent stream is present in the polymerization reaction mixture in an amount of from about 25% to about 70% by weight with 45% to about 65% by weight being preferred depending upon the properties finally desired.

In carrying out the polymerization reaction, the hydrocarbon mixture is brought into contact with a Friedel Crafts catalyst such as $BF_3$, $BF_3$ etherates, $AlCl_3$, $CH_3CH_2AlCl_2$, or similar catalysts containing aluminum chloride or boron fluoride, with anhydrous aluminum chloride being preferred. Other Friedel Crafts catalysts may be used. The catalyst may be gaseous, liquid or solid. Generally, the catalyst is used in gaseous $BF_3$ or particulate $AlCl_3$ form having a particle size in the range of from about 5 to about 200 mesh size, although larger or smaller particles can be used. The amount of catalyst used ranges from about 0.5% to about 2.0% by weight, preferably 1.0% to 2.0% by weight. The catalyst may be added to the hydrocarbon mixture or the hydrocarbon mixture may be added to the catalyst. The reaction can be conducted continuously or by batch process techniques generally known to those skilled in the art.

The reaction should also be carried out at a pressure of from 10 psi (0.7 Kg/cm$^2$) to 80 psi (56 Kg/cm$^2$), preferably 20 (1.4 Kg/cm$^2$), psi. The temperature of reaction ranges from about 20° C. to 100° C., more usefully from 30° C. to 60° C., and most preferably from about 35° C. to about 50° C. The time of polymerization ranges from one-fourth to 2.0 hours, preferably from 20 minutes to 1 hour.

The reaction is conveniently carried out in the presence of a diluent because the reaction is usually exothermic and the resulting product is viscious. However, with adequate mixing and cooling, the temperature can be controlled and reaction conducted with only sufficient diluent to maintain good heat transfer for the heat of polymerization. The diluent may be introduced as an integral component of the feedstock streams when concentrates, reaction mixtures or distillation fractions are used, but various other diluents which are inert in that they do not enter into the polymerization reaction, may be separately added. Representative examples of inert diluents are aliphatic hydrocarbons such as pentane, hexane and heptane, aromatic hydrocarbons such as xylene, toluene and benzene, and unreacted residual hydrocarbons from the reaction may be useful as diluents.

After the polymerization is complete, the catalyst is quenched by well known means, usually by adding water and alcohol solution followed by resin recovery which involves stripping of unreacted hydrocarbons, including diluent from the resin as known by those skilled in preparing such resins. This "finishing" step is usually carried out by heating, in a nitrogen environment, usually to about 250° C., followed by stream stripping to remove unreacted material and low molecular weight oligomers ("fill"). The degree of stripping can be varied somewhat as described to make small adjustments to the softening point.

The raffinate removed can be saved and used as the diluent for other polymerization reactions to form resins.

The resin obtained by the above-identified polymerization process using the feedstock herein described can have a wide variety of properties within the scope of the aforesaid parameters (they will still have light color and a low softening point between 0° C. and 40° C.) by varying feedstock selection. For example, if a Gardner color of 6 to 8 can be tolerated, then (1) the vinyl aromatic feed stream can be derived from a distillation cut boiling in the range of from about 80° C. to about 260° C. from a stream cracked aromatic hydrocarbon stream; and (2) a piperylene concentrate ($C_5$ olefin and diolefin mixture) which is not heat soaked can be used. If slightly better color, i.e., Gardner 3 to 6 is desired, then a styrene concentrate, i.e., a distillation stream containing predominantly styrene and its various substituted styrene materials such as alpha-methylstyrene, para-methylstyrene or vinyl-toluenes may be used. Finally, if Gardner color less than 3 is desired, then it is preferred to use pure styrene or substituted styrene monomers, with styrene, alpha-methylstyrene or mixtures thereof being preferred. When these monomers or mixtures of pure monomers are used with a heat soaked piperylene concentrate, a preferred resin having a color of 2 or less on the Gardner scale, a molecular weight distribution of from 1.15 to 1.25 and a softening point of from 15° C. to 30° C. can be obtained. These are superior resins for use in adhesives. The resins of this invention can be readily blended with copolymers using well known methods to form adhesives and find great use as such.

The resins of this invention can be readily prepared from the foregoing description and the following examples. Those skilled in preparing adhesives from petroleum hydrocarbon resins will be able to incorporate same with copolymers. Accordingly, this invention is further described by the following examples which are offered by way of explanation and for the purposes of guiding those skilled in the art to the practice of this invention and the broadening of its usefulness and not for purposes of limitation thereof and it should not be so construed.

EXAMPLES 1-4

The liquid resins of Examples 1-4 were polymerized batchwise using aluminum chloride catalyst in a nitrogen atmosphere at about 12 psig (0.84 Kg/cm$^2$). The aluminum chloride catalyst (having particle size between 5 and about 200 mesh) is added in anhydrous form. In these polymerizations, 400 grams of feed blend, in proportions indicated in Table 1, were pumped into a closed, stirred reactor containing catalyst, over a thirty minute period of time and then left in contact with the catalyst for an additional thirty minutes with stirring. A 400 gram 1:3 solution of isopropanal:water was added to the reaction mixture to quench the catalyst and the polymerizate was water washed two to three additional times with the aqueous phase being separated after each wash.

The polymerizate was finished by heating to 250° C. in a nitrogen atmosphere to remove unreacted material. The polymerizate was then stream stripped at 250° C. to produce the finished resin.

In Examples 1-4, the xylenes, styrene, p-methylstyrene, mixed methyl styrenes and alpha-methylstyrene components were of at least 96% purity. The compositions of the heat soaked piperylene concentrate and isoamylene concentrate used are shown below:

|  | Piperylene Concentrate | Isoamylene Concentrate |
|---|---|---|
| Pentene-1 | 1.8 | 33.6 |
| Pentene-2[1] | 8.7 | 26.3 |
| 2 Methylbutene-1 | 0.1 | 29.6 |
| 2 Methylbutene-2 | 3.2 | 3.3 |
| Cyclopentene | 12.2 | — |
| Pentadiene-1,3[1] | 19.9 | — |
| Low reactivity olefins and nonreactive paraffins | 54.1 | 7.2 |

[1] cis and trans isomers

These examples show the influence of aromatic olefin structure on resin properties. Resin properties are shown in Table 1 below:

TABLE 1

| Example | 1 | 2 | 3 | 4 |
|---|---|---|---|---|
| Feed Composition (part by weight) | | | | |
| Isoamylene Concentrate | 50 | → | → | → |
| Piperylene Concentrate | 21.4 | → | → | → |
| Styrene | 28.6 | — | — | — |
| P-Methylstyrene | — | 28.6 | — | — |
| Mixed Methylstyrenes | | | | |
| Meta-60% | — | — | 28.6 | — |
| Para-40% | | | | |
| Alpha-Methylstyrene | — | — | — | 28.6 |
| Xylenes | 42.9 | → | → | → |
| Polymerization | | | | |
| Catalyst wt % | 1.4 | → | → | → |
| Reactor Temperature, °C. | 45 | → | → | → |
| Reactor Pressure, psig | 12 | → | → | → |
| Resin Finishing | | | | |
| Resin Yield, wt % | 37.1 | 37.6 | 38.5 | 22.6 |
| Resin Properties | | | | |
| Softening Point, °C. | 21 | 36 | 22.5 | 15 |
| Cloud Point, °C. 20/40/40 (a) | <70 | → | → | → |
| Gardner Color (b) | 3.5 | 3.5 | 4.5 | 6.5 |
| GPC Molecular Weight | | | | |

TABLE 1-continued

| Example | 1 | 2 | 3 | 4 |
|---|---|---|---|---|
| Mn | 135 | 197 | 142 | 125 |
| Mw | 210 | 403 | 232 | 195 |
| Mw/Mn | 1.56 | 2.05 | 1.63 | 1.56 |

(a) The temperature at which there is an appearance of haze or "cloud" in a mix of 40 parts 60° C. melt point paraffin wax, 20 parts of Escorene ® 7750 (ethylene vinylacetate, 28% vinylacetate) from Exxon Chemical Company and 40 parts test resin heated to 200° C. and allowed to cool in air with stirring.
(b) 50 wt % resin solution in toluene with comparator discs.

The ring and ball softening points of the resins were determined using a modified ASTM E-28 procedure. The softening point was measured in a 50/50 ethylene glycol/water solution. The rings were kept in a −25° to −30° C. environment until the ethylene glycol/water solution was cooled to that temperature range. The ring and ball softening point apparatus was assembled and heated at 5° C./min. The softening point temperature was then read according to the ASTM E-28 procedure.

EXAMPLES 5-13

Examples 5-13, a styrene concentrate fraction of steam cracked naphtha boiling within the range of from 80° C. to 190° C. was used with the isoamylene and piperylene concentrate to prepare resins in the manner described in Examples 1-4 about in proportions as set forth in Table 3. The compositions of the styrene concentrates are shown in Table 2 below:

TABLE 2

| COMPOSITION OF STYRENE CONCENTRATES | | | |
|---|---|---|---|
| Component | I | II | III |
| Ethyl Benzene | 4.6 | 2.6 | 6.5 |
| o, m, p-Xylene | 30.3 | 24.8 | 40.5 |
| Styrene | 28.8 | 26.5 | 33.6 |
| Alpha-Methylstyrene | 3.0 | 4.3 | 1.2 |
| Vinyl Toluenes | 5.1 | 7.6 | 1.5 |
| Other Alkyl-substituted Benzenes | 28.2 | 34.2 | 16.7 |

These resins were polymerized and finished, and the softening points were determined using the same procedures discussed in Examples 1-4. These examples show the effect of varying feed blend ratios on resin properties. Note the high color and softening points of certain resins derived from the styrene concentrates.

Examples 10, 12 and 13 show the effect of styrene concentrate composition on resin properties.

TABLE 3

| Example | 5 | 6 | 7 | 8 | 9 | 10 | 11 | 12 | 13 |
|---|---|---|---|---|---|---|---|---|---|
| Feed Composition, parts by weight | | | | | | | | | |
| Isoamylene Concentrate | 35 | 20 | 15 | — | 70 | 55 | 40 | 55 | 55 |
| Piperylene Concentrate | 15 | 30 | 15 | 30 | — | 15 | 30 | 15 | 15 |
| Styrene Concentrate I | 50 | 50 | 70 | 70 | 30 | 30 | 30 | — | — |
| Styrene Concentrate II | — | — | — | — | — | — | — | 30 | — |
| Styrene Concentrate III | — | — | — | — | — | — | — | — | 30 |
| Polymerization | | | | | | | | | |
| Catalyst, wt % | 1.4 | 2.0 | 2.0 | 1.4 | 1.4 | 2.0 | 1.4 | 1.4 | 1.0 |
| Reactor Temperature °C. | 45 | → | → | → | → | → | → | → | → |
| Reactor Pressure, psig | 12 | → | → | → | → | → | → | → | → |
| Resin Finishing | | | | | | | | | |
| Resin Yield wt % | 29.1 | 31.2 | 33.2 | 29.8 | 13.6 | 21.4 | 24.8 | 29.3 | 29.5 |
| Resin Properties | | | | | | | | | |
| Softening | 38 | 50 | 50 | 64 | 20 | 29 | 40 | 21 | 13 |

TABLE 3-continued

| Example | 5 | 6 | 7 | 8 | 9 | 10 | 11 | 12 | 13 |
|---|---|---|---|---|---|---|---|---|---|
| Point, °C. | | | | | | | | | |
| Gardner Color | 10 | 10.5 | 11.5 | 11 | 12 | 10.5 | 8.5 | 10 | 6 |
| GPC Molecular Weight | | | | | | | | | |
| Mn | 175 | 167 | 141 | 156 | 194 | 183 | 200 | 304 | 280 |
| Mw | 344 | 349 | 361 | 419 | 287 | 333 | 304 | 432 | 372 |
| Mw/Mn | 1.97 | 2.09 | 2.56 | 2.69 | 1.48 | 1.82 | 1.52 | 1.42 | 1.33 |

EXAMPLES 14-20

In Examples 14-20, a mixed $C_6$ monoolefin stream prepared from the dimerization of propylene was used in place of isoamylene concentrate in resins produced as described in Examples 1-4 above. Typical compositions of the $C_6$ olefin stream and the piperylene concentrate used in these examples follow:

| Typical Composition of Mixed $C_6$ Olefin Stream, %* | |
|---|---|
| 2-Methyl-1-Pentene | 3.9 |
| 2-Methyl-2-Pentene | 25.9 |
| 2,3-Dimethyl-1-Butene | 2.8 |
| 2,3-Dimethyl-2-Butene | 2.7 |
| Other $C_6$ Olefins | 50.5 |
| $C_9$ Olefins | 14.2 |
| Typical Composition of Heat Soaked Piperylene Concentrate, % | |
| 1-Pentene | 2.5 |
| Cis and trans-2-Pentene | 6.5 |
| 2-Methyl-1-Butene | 0.2 |
| 2-Methyl-2-Butene | 3.7 |
| Cyclopentene | 17.4 |
| Cis and trans-Piperylene | 28.8 |
| Low reactivity olefins and nonreactive paraffins | 40.9 |

*"Dimate", from Diamond Shamrock, produced by dimerization of propylene.

In these Examples, pure styrene and alpha-methylstyrene monomers were used as the vinyl aromatic hydrocarbon stream resulting in resins having an aromatic content from about 10 weight percent to about 60 weight percent and a Gardner color of about 1. The feedstock composition and resin properties are shown in Table 4 below. These resins are particularly useful to prepare adhesives in the practice of this invention.

TABLE 4

| Example | 14 | 15 | 16 | 17 | 18 | 19 | 20 |
|---|---|---|---|---|---|---|---|
| Feed Composition, Parts by wt. | | | | | | | |
| $C_6$ Olefins ("Dimate") | 69.4 | 36.5 | 59.5 | 59.5 | 50.8 | 66 | 43.9 |
| Piperylene Concentrate (1) | 25.2 | 13.7 | 22.5 | 22.5 | 19 | 24 | 16.4 |
| Styrene | 3.6 | 32.6 | 12 | 18 | 25.4 | 6.7 | 32.9 |
| Alpha-Methylstyrene | 1.8 | 17.1 | 6 | — | 4.8 | 3.3 | 6.8 |
| Paraffinic Diluent | — | 46.2 | 49.2 | — | 58.7 | — | 37.0 |
| Polymerization | | | | | | | |
| Catalyst, wt % | 1.2 | 1.2 | 1.2 | 1.2 | 1.2 | 1.2 | 1.5 |
| Reactor Temperature, °C. | 40 | 40 | 40 | 40 | 40 | 40 | 40 |
| Reactor Pressure, psig | 10 | 10 | 10 | 10 | 10 | 10 | 10 |
| Resin Finishing | | | | | | | |
| Resin Yield, wt % | 24 | 50 | 30 | 37 | 36 | 28.3 | 46.3 |
| Fill, wt % | 1 | — | 4 | 4 | 4 | 7.1 | 4.3 |
| Resin Properties | | | | | | | |
| Softening Point, °C. | 20 | 21 | 17 | 23.5 | 24 | 23.5 | 29 |
| Cloud Point, °C. | 66 | 65 | 65 | 65 | 69 | 65 | 65 |
| Gardner Color | 1+ | 1+ | 1+ | 1+ | 1+ | 1— | 1— |
| Vinyl Aromatic Content, wt % | 12 | 59 | 34 | — | 45 | 25 | 51 |
| GPC Molecular Weight | | | | | | | |
| Mn | 426 | 362 | 445 | 396 | 472 | 399 | 406 |
| Mw | 521 | 443 | 522 | 453 | 578 | 467 | 499 |
| Mw/Mn | 1.22 | 1.22 | 1.17 | 1.14 | 1.22 | 1.17 | 1.23 |

(1) Heat soaked

EXAMPLES 21-23

In these Examples, the mixed $C_6$ monoolefin stream prepared from the dimerization of propylene was used again in the monomer described for the examples above. However, in Example 21 no piperylene was used; in Example 22 an ethyl aluminum dichloride catalyst was used; and in Example 23 a $BF_3 \, O(CH_2CH_3)_2$ (etherate) catalyst was used for Friedel Crafts polymerization. The feedstock composition and resin properties are shown in Table 4A below.

TABLE 4A

| Example | 21 | 22 | 23 |
|---|---|---|---|
| Feed Composition, Parts by wt. | | | |
| $C_6$ Olefins ("Dimate") | 25.0 | 59.5 | 56.3 |
| Piperylene Concentrate (1) | — | 22.5 | 22.0 |
| Styrene | 24.0 | 12.0 | 21.7 |
| Alpha-Methylstyrene | 11.0 | 6.0 | — |
| Paraffinic Diluent | 40.0 | — | — |
| Polymerization | | | |
| Catalyst, wt % | 1.2 | 1.2 | 1.0 |
| Reactor Temperature, °C. | 40 | 40 | 40 |
| Reactor Pressure, psig | 10 | 10 | 10 |
| Resin Finishing | | | |
| Resin Yield, wt % | 47.0 | 41.4 | 30.5 |
| Fill, wt % | 7.9 | 2.7 | 12.9 |

TABLE 4A-continued

| Example | 21 | 22 | 23 |
|---|---|---|---|
| Resin Properties | | | |
| Softening Point, °C. | 18 | 21.5 | 18 |
| Cloud Point, °C. | 65 | 65 | 65 |
| Gardner Color | 1+ | 4+ | 1− |
| Vinyl Aromatic Content, wt % | 64 | 34 | 50 |
| GPC Molecular Weight | | | |
| Mn | 355 | 392 | 290 |
| Mw | 434 | 479 | 407 |
| Mw/Mn | 1.22 | 1.22 | 1.4 |

(1) Heat soaked

EXAMPLES 24–26

In Examples 24–26, a heart cut distillate (80° C. to 260° C.) derived from steam cracked naphtha was used in place of the pure vinyl aromatic monomers in resins produced as described in Examples 1–4 above. A typical composition of this heart cut distillate is shown below.

| Typical Composition of Heart Cut Distillates: wt % | |
|---|---|
| Styrene | 7.2 |
| Vinyl Toluenes | 13.9 |
| Alpha-Methyl styrene | 3.8 |
| Beta-Methyl styrene | 3.1 |
| Indene | 12.1 |
| Non reactive Aromatics and Alkyl substituted Aromatics | 59.9 |

The feedstock compositions and resin properties are shown in Table 5 below:

TABLE 5

| Example | 24 | 25 | 26 |
|---|---|---|---|
| Feed Composition (parts by weight) | | | |
| C6 Olefins | 55 | 45 | 58.8 |
| Piperylene Concentrate (1) | 15 | 10 | 23.5 |
| Heart Cut Distillate | 30 | 45 | 17.6 |
| Polymerization | | | |
| Catalyst, wt % | 1.4 | 1.4 | 1.2 |
| Reactor Temperature, °C. | 40 | 40 | 40 |
| Reactor Pressure, psig | 10 | 10 | 10 |
| Resin Finishing | | | |
| Resin Yield, wt % | 40.7 | 46.6 | 29.6 |
| Fill, wt % | — | — | 7.6 |
| Resin Properties | | | |
| Softening Point, °C. | 23 | 26 | 21 |
| Cloud Point, °C. | 66 | 65 | 65 |
| Gardner Color | 6+ | 7 | 4+ |
| Vinyl Aromatic Content, wt % | 37 | 49 | 22 |
| GPC Molecular Weight | | | |
| Mn | 504 | 428 | 423 |
| Mw | 705 | 571 | 518 |
| Mw/Mn | 1.40 | 1.35 | 1.22 |

(1) Heat Soaked

Better color (i.e., a lower Gardner number) could be achieved in the above formulation if the heart cut distillate were acid treated using known methods.

EXAMPLES 27 AND 28

In the manner described in Examples 1–4, Examples 27 and 28 demonstrate the use of diisobutene and an isoamylene concentrate to prepare resins within the scope of the invention. The resin of Example 27 was stripped excessively, resulting in a softening point of 41° C. If excessive had not occurred, the softening point would have been 40° C. or less with a Gardner color of about 2 also resulting. The results of these experiments are shown in Table 6:

TABLE 6

| Example | 27 | 28 |
|---|---|---|
| Feed Composition, Parts by wt. | | |
| Styrene | 16.3 | 12.0 |
| Alpha-Methylstyrene | 8.2 | 6.0 |
| Heat Soaked piperylenes | 30.6 | 22.5 |
| Diisobutene | 44.9 | — |
| Isoamylene | — | 59.5 |
| Diluent | 104.1 | 27.2 |
| Polymerization | | |
| Catalyst, wt % | 1.2 | 1.2 |
| Reactor Temperature, °C. | 40 | 40 |
| Reactor Pressure, psig | 10 | 10 |
| Resin Finishing | | |
| Resin Yield, wt % | 27.4 | 44.3 |
| Fill, wt % | 12.0 | — |
| Resin Properties | | |
| Softening Point, °C. | 41 | 10 |
| Cloud Point, °C. | 65 | 65 |
| Gardner Color | 4+ | 1 |
| Resin Molecular Weight, GPC | | |
| Mn | 519 | 356 |
| Mw | 619 | 400 |
| Mw/Mn | 1.19 | 1.12 |

The low softening point liquid resins described above are all applicable in the practice of the instant invention to make adhesives when combined with a copolymer. The copolymers useful for the practice of this invention are generally known as, for example, styrene/isoprene/styrene (SIS), polyethylene vinyl acetate (EVA) (from about 25% to about 45% by weight vinyl acetate), styrene/butadiene/styrene (SBS) and styrene/ethylene/butylene/styrene (SEBS), and the like. Of particular interest are the styrene/butadiene copolymers which are more difficult to tackify than other polymers using a resin and often require not only a tackifier but an oil to act as a plasticizer thus giving rise to the problem of "bleed" and/or "creep" when the adhesive is applied to a paper or polymer substrate. When the need is for a light color, essentially water white resin, previously only resins prepared from nonaromatic materials were available since aromaticity had heretofore imparted color to the resin which was unacceptable for certain applications, including premium packaging and disposable diapers. The presence of an oil in the adhesive composition has other detrimental effects such as unacceptable creep and bond release along a polyethylene film, particularly in a case where disposable diapers are involved. Thus, the resins described above, particularly those of Examples 14–20 which can be used with styrene/butadiene polymers in a binary system, i.e., by eliminating the plasticizer, are particularly useful.

Well known styrene/butadiene copolymers useful in the practice of this invention are those sold by Shell under the "Kraton" trademark and by the Firestone under the "Stereon" trademark. Both of those are styrene/butadiene copolymers which form particularly attractive adhesives when used in combination with the above-identified resins, particularly the very low color resins of Examples 14–20 having a softening point of around 20° C. The "Stereon" copolymer grade 840A is a copolymer containing 42% styrene. In formulating the adhesive, the liquid resin is present in amounts from 20% to 80% by weight with the copolymer present in, correspondingly, 80% to 20%. The preferred adhesive would contain from about 30% to about 70% by weight of the resins with from about 35% to about 50% by weight in the adhesive being especially preferred. In binary adhesives, the copolymer will be present in corresponding amounts. However, other components may be present. Optionally, a resin having a higher softening point, from about 80° C. to about 120° C., may be used as an additional component of the adhesive composition. While the preferred adhesive is a binary system comprising two reactants, the copolymer and the light color resins described herein, such binary system may still include such nonreactive ingredients as fillers, inhibitors, and the like. Representative of fillers would be, for example, calcium carbonate, titanium oxides, finely divided clays, talc and the like.

Once blended using methods and techniques well known to those skilled in the art, the adhesive would be coated on a substrate such as "Mylar" film (Dupont Company) or "Endura" film (Akrosil). The adhesive is then evaluated in terms of those parameters important to adhesives such as rolling ball tack, polyken tack, peel strength, holding power and aged retention of these properties.

The adhesive compositions of the present invention may be applied to a substrate and, if solvent coated, dried using conventional procedures. The substrate used depends upon the anticipated use, but it is usually relatively thin material, usually no greater than about 3.2 mm in thickness, and in the manufacture of tapes and labels, the substrate is a relatively thin sheet material. The sheet material may be a polymeric material which is flexible at about room temperature. The sheet material may be a homo-polymer of an ethylenically unsaturated monomer such as ethylene, propylene or vinyl chloride, or be polyester, polyacetate or polyamide provided it has sufficient flexibility for the desired end use. Alternatively, the substrate may be made from cellulosic or reconstituted cellulosic material such as rayon. The substrate need not be a sheet material but may be composed of fibers which may be woven, or nonwoven as is the case in paper. Woven substrates may be made from cellulosic material, such as cotton or from fibers of any of the above mentioned polymers.

The composition is applied to the substrate using conventional coating techniques such as roller coaters, blade coaters, meyer rods or air coaters. The coated substrate can be dried usually by passing it through a heating tunnel or oven through which may be circulating hot air or the tunnel or oven may contain infrared lamps to dry the coated substrate. The drying time will be a function of a number of factors such as the heat capacity of the substrate, the type of heating, the oven temperature, air velocities (if circulating air is used) and the rate of passage of the substrate through the heater.

The substrate should be coated with sufficient composition to provide a dry coat weight from about 16 to about 57 g/m². Generally in the manufacture of tapes using a continuous sheet polymeric substrate, a dry coat weight of about 15–30 g/m² is used. In the manufacture of labels, a dry coat weight from about 15 to 30 g/m² is usually used. In the manufacture of masking tape, a dry coat weight from about 35 to about 65 g/m² is usually used.

After drying, the coated substrate is cut to the required dimension. In the manufacture of tape, the substrate is cut into strips and rolled to provide a finished product. The substrate may also be cut into shaped items to provide labels or medicinal tapes.

One particularly attractive use for the pressure sensitive adhesives of the present invention is in diaper tabs for disposable diapers, particularly repositional tabs which employ a "Mylar" polymer substrate coated as stated above with 1.5 mil adhesive as shown in Table 7 below.

TABLE 7

| Adhesion Testing of Commercial Disposable Diaper Tabs | | |
|---|---|---|
| Product | Commercial Tab "1" | Commercial Tab "2" |
| Polyken Tack (g) | | |
| Initial | 291 | 407 |
| Aged (2) | 451 | 487 |
| 180° Peel Strength (lb/in) (1) Stainless Steel | | |
| Initial | 6.28 | 5.75 |
| Aged (2) | 6.00 | 2.25 |
| Polyethylene (3) | | |
| Initial | 1.63 | 1.63 |
| Aged (2) | 1.40 | 0.80 |
| Repeat Polyethylene (4) | | |
| Initial | 1.67 | SF (6) |
| Aged (2) | 1.50 | 1.23 |
| Loop Tack (lb/in) Stainless Steel | | |
| Initial | 3.42 | 2.42 |
| Aged (2) | 0.75 | 2.00 |
| 178° Holdind Power, (5) (hrs.) Stainless Steel | | |
| Initial | 2.61 | 14.99 |
| Aged (2) | 0.26 | 13.11 |

(1) 1.5 mil drawdown on 0.01 g/cm² backing
(2) Aging Conditions: 2 weeks at 158° F.
(3) 10 mil polyethylene film (from Tab "1")
(4) 2 hours at room temperature
(5) 1/2" × 1/2", 1 kg
(6) Substrate Failure The mechanical preparation of the adhesives of this invention are well known to those skilled in the art. In addition to the components which make up the adhesives of this invention, i.e., the copolymers and the low softening, light color resin described above, other materials, well known to those skilled in the art may be added without departing from the invention such as, for example, fillers or resins having higher melting points such as, for example, from about 80° C. to about 120° C. in order to impart additional strength to the resulting pressure sensitive adhesive. In some applications, it may be desirable to add up to about 60 weight percent of "hard" resin such as that described in U.S. Pat. No. 4,514,554 for example, the disclosure of which is incorporated herein by reference, and U.S. Pat. No. 4,391,961. Both provide often desirable modifications of the pressure sensitive adhesive of this invention.

Preferred adhesives are made with a styrene/butadiene copolymer having from about 40% to about 50% styrene. In use, the adhesives are applied to a polyacetate or cellulose backing in a thickness of from 0.7 to 1.5 mil. To illustrate the present invention, adhesives were made by mixing a styrene/butadiene copolymer having 42% styrene polymer ("Stereon" Resins from Firestone) with resins similar to, and prepared in the same manner as, those of Examples 16 and 18 and commercially available resins useful to produce adhesives with such styrene/butadiene copolymer. The characteristics of the liquid resins compared are set forth in Table 8.

TABLE 8

Comparison of Liquid Resins with Styrene/Butadiene Copolymer (Stereon ® 840A)

|  | Exp 16 (34% Aromatic) | Exp 18 (45% Aromatic) | Regalrez 1018 (Hercules) | Hercolyn D (Hercules) | Zonarez A-25 (Arizona) | Wingtack 10 (Goodyear) |
|---|---|---|---|---|---|---|
| Type | Aromatic/ Aliphatic | Aromatic/ Aliphatic | Hydrogenated Aromatic | Rosin Ester | Terpene/ Oil | Aliphatic |
| Softening Point (°C.) | 22 | 24 | 17 | 0 | 20 | 8.5 |
| Cloud Point(1) | 97 | 100 | 100 | 98 | 97 | 109 |
| Viscosity (cps) | | | | | | |
| 100° F. | 22950 | 24000 | 17750 | 895 | 20100 | 5713 |
| 200° F. | 99 | 123 | 83 | 19 | 67 | 58 |
| Gardner Color(2) | | | | | | |
| Initial | 2− | 1.5 | <1 | 2+ | 2+ | 1 |
| Aged (16 Hrs/300° F.) | 4+(3) | 5−(3) | 2− | 11 | 13− | 9+ |
| Mw | 577 | 518 | 383 | 252 (bimodal) | 416 (trimodal) | 623 |
| Mn | 492 | 518 | 346 | 235 | 346 | 531 |
| Mw/Mn | 1.17 | 1.17 | 1.11 | 1.07 | 1.20 | 1.17 |
| Volatility (wt % loss) | | | | | | |
| 10 g/5 Hr/ 350° F.(4) | 6−7 | 6−7 | 11.3 | >20 | 18.1 | 14.1 |

(1)Multiwax 195 (microcrystalline wax - M.P. 195° F.) - 33 wt %; Elvax 150 (EVA - M.P. 150° F.) - 27; Resin - 40 wt %
(2)50% in toluene.
(3)Inhibited with Irganox 1010 at 0.15 wt %.
(4)3" diameter aluminum dish.

These resins as shown are used in preparing a repositional diaper tab in varying proportions of resin to copolymer in the manner of mixing well known to those skilled in the art. The adhesive was applied in the amount of 1.5 mil drawdown on 0.005 g/cm² "Mylar" polyacetate film backing. The test results are as shown in Table 9 and Table 10.

TABLE 9

LIQUID RESINS COMPARISONS
PERFORMANCE IN STEREON 840A COPOLYMER
REPOSITIONABLE DIAPER TABS

Aging Conditions: 2 weeks at 158° F.
1.5 ml drawdown on .005 g/cm² mylar backing

|  | Formulation (1) wt % | | Rolling Ball Tack cm | | Polyken Tack g | | Loop Tack lb/in SS | | 178° Holding Power hr SS, ¼" × ¼", 1 kg | |
|---|---|---|---|---|---|---|---|---|---|---|
|  | Copolymer | Resin | Initial | Aged | Initial | Aged | Initial | Aged | Initial | Aged |
| Resin of Example 16 | 80 | 20 | >30.0 | >30.0 | <10 | <10 | <.01 | <.01 | >100.0 | 0.0 |
|  | 65 | 35 | 7.2 | 8.8 | 174 | 237 | 0.13 | 0.12 | >100.0 | >100.0 |
|  | 50 | 50 | 3.1 | 2.0 | 812 | 718 | 0.85 | 0.72 | >100.0 | 2.6 |
|  | 35 | 65 | 2.7 | 2.3 | 997 | 1000 | 3.41 | 1.08 | 2.6 | 0.3 |
|  | 20 | 80 | 2.4 | 2.3 | 1357 | 1192 | 3.29 | 2.90 | 0.4 | 0.3 |
| Zonarez A-25 | 80 | 20 | >30.0 | >30.0 | <10 | <10 | <.01 | <.01 | >100.0 | 0.0 |
|  | 65 | 35 | 4.7 | 12.7 | 262 | 205 | 0.15 | 0.17 | >100.0 | >100.0 |
|  | 50 | 50 | 3.1 | 3.3 | 659 | 468 | 0.27 | 0.62 | >100.0 | 3.4 |
|  | 35 | 65 | 2.5 | 2.1 | 721 | 602 | 0.55 | 0.95 | 0.9 | 0.4 |
|  | 20 | 80 | 2.3 | 2.7 | 843 | 736 | 1.20 | 0.62 | 0.2 | 0.2 |
| Regalrez 1018 | 80 | 20 | >30.0 | >30.0 | 71 | <10 | <.01 | <.01 | >100.0 | 0.0 |
|  | 65 | 35 | 5.6 | 9.4 | 457 | 198 | 0.50 | 0.16 | >100.0 | >100.0 |
|  | 50 | 50 | 3.2 | 2.8 | 948 | 685 | 1.08 | 0.93 | >100.0 | 2.6 |
|  | 35 | 65 | 2.5 | 2.2 | 1009 | 1017 | 1.43 | 1.50 | 0.6 | 0.5 |
|  | 20 | 80 | 1.7 | 2.6 | 1103 | 940 | 3.29 | 1.95 | 0.5 | 0.5 |

|  | Formulation (1) wt % | | 180° Peel Strength lb/in | | | | Repeat Polyethylene 2 hrs | | |
|---|---|---|---|---|---|---|---|---|---|
|  | | | Stainless Steel (SS) | | Polyethylene (2) | | | | |
|  | Copolymer | Resin | Initial | Aged | Initial | Aged | Initial | Aged | Staining |
| Resins of Example 16 | 80 | 20 | 0.63 | 0.00 | 0.00 | 0.00 | | | |
|  | 65 | 35 | 0.30 | 0.08 | 0.00 | 0.00 | | | |
|  | 50 | 50 | 2.40 | 1.80 | 0.68 | 0.23 | 0.70 | 0.24 | None |
|  | 35 | 65 | 2.82 | 2.02 | 0.95 | 0.72 | 0.98 | 0.70 | Slight |
|  | 20 | 80 | 7.47 | 7.38 | SF (3) | 1.65 | | SF | |
| Zonarez A25 | 80 | 20 | 0.00 | 0.00 | 0.00 | 0.00 | | | |
|  | 65 | 35 | 0.32 | 0.00 | 0.00 | 0.00 | | | |
|  | 50 | 50 | 1.15 | 0.48 | 0.30 | 0.00 | 0.70 | | None |
|  | 35 | 65 | 1.45 | 0.77 | 0.50 | 0.00 | 0.80 | | Heavy |
|  | 20 | 80 | 3.19 | 1.33 | SF | 0.25 | | 0.35 | |

TABLE 9-continued
LIQUID RESINS COMPARISONS
PERFORMANCE IN STEREON 840A COPOLYMER
REPOSITIONABLE DIAPER TABS Aging Conditions: 2 weeks at 158° F.
1.5 ml drawdown on .005 g/cm² mylar backing

| | | | | | | | | |
|---|---|---|---|---|---|---|---|---|
| Regalrez | 80 | 20 | 0.17 | 0.00 | 0.00 | 0.00 | | |
| 1018 | 65 | 35 | 1.18 | 0.17 | 0.00 | 0.00 | | |
| | 50 | 50 | 1.92 | 1.53 | 0.65 | 0.25 | 0.58 | 0.15 | None |
| | 35 | 65 | 2.58 | 1.88 | 0.93 | 0.77 | 1.50 | 0.80 | Slight |
| | 20 | 80 | 6.18 | 4.83 | SF | 0.70 | | SF | |

(1) Includes 0.5 wt % Irganox 1010
(2) 1 ml thick polyethylene (PE) film from Commercial Tab "1"
(3) Substrate Failure To further demonstrate the advantages of this invention, a pressure sensitive adhesive is described below using the above described liquid resin, the styrene/butadiene copolymer, and a commercially available inhibitor. The 20° C. softening point liquid resin is similar to the one described in Examples 10 and 12 with the properties as shown in Table 8.

TABLE 10
REMOVABLE PRESSURE SENSITIVE ADHESIVES

| | parts by wt. | parts by wt. |
|---|---|---|
| Liquid Resin from Examples 16 and 18 | 60 | 67 |
| Stereon ® 840A styrene-butadiene copolymer (42% Styrene) | 40 | 33 |
| Irganox ® 1010 inhibitor | 0.5 | 0.5 |

| | Initial | Aged | Initial | Aged |
|---|---|---|---|---|
| Rolling Ball Tack (cm) | 3.0 | 3.5 | 2.8 | 3.1 |
| Polyken Tack (g) | 664 | 491 | 770 | 521 |
| 180° Peel Strength (lb/in) | | | | |
| to SS | 1.48 | 1.07 | 1.44 | 1.79 |
| to PE (10 mil, untreated) | 1.00 | 0.42 | 1.15 | 1.13 |
| Loop Tack (lb/in) | | | | |
| to SS | 0.35 | 0.35 | 0.66 | 0.75 |
| To PE (10 mil, untreated) | 0.60 | 0.68 | 0.28 | 0.56 |
| SAFT to SS (°F.) | 132 | 123 | 123 | 126 |
| 178° Holding Power (hrs) ($\frac{1}{2}'' \times \frac{1}{2}'' \times 2,000$ g) | 9.5 | 27.9 | 3.9 | 3.7 |

As seen from the foregoing, the pressure sensitive adhesive of the present invention provides considerable advantage over other pressure sensitive adhesives made with available liquid resins.

EXAMPLE 29

Hydrogenation of the resins of the invention results in a color improvement. A resin very much like that of Example 24 and Table 5 was hydrogenated by dissolution of the resin in an inert, predominantly saturated hydrocarbon solvent (Varsol) at 30 wt. % concentration and passing the solution over a sulfided nickel/tungsten/alumina catalyst. The flow rate was 1.5 VVH, hydrogenation pressure 3000 psi and inlet temperature 270 degrees C. The hydrogenated solution was stripped to give a 28.3% yield of product with a color of 28 Saybolt (measured as 10% solution in toluene; water white resin is 30 Saybolt) and softening point of 19 degrees C. The GPC molecular weight was indicated to be the same as for the resin of Example 24 both before and after hydrogenation. The vinyl aromatic content dropped slightly to about 22%. The hydrogenated resin has proven to be an excellent water white tackifier in various adhesive formulations as described above.

Other suitable catalysts for hydrogenation include nickel and palladium based catalysts preferably supported on alumina or similar material. Hydrogenation temperatures and pressures can be much lower than as given in the example, or higher as needed depending on the catalyst.

The foregoing disclosure and description of the invention are illustrative and explanatory thereof, and various changes in the components, parameters and proportions, as well as in the details of the illustrated examples, may be made without departing from the spirit and scope of the claimed invention.

We claim:

1. A hydrocarbon resin having a softening point of from 0° C. to about 40° C., a Gardner color of about 7 or less, a number average molecular weight (Mn) of from about 100 to about 600, and a $M_w/M_n$ ratio of from about 1.1 to about 2.7, prepared by Friedel Crafts polymerization of a hydrocarbon feed comprising:
   (a) from about 5% to about 75% by weight of a $C_8$ to $C_{10}$ vinyl aromatic hydrocarbon stream;
   (b) up to about 35% by weight of a piperylene stream; and
   (c) from about 25% to about 70% by weight of a stream containing $C_4$ to $C_8$ monoolefin chain transfer agent of the formula $RR'C=CR''R'''$ where R and R' are $C_1$ to $C_5$ alkyl, R'' and R''' are independently selected from H and a $C_1$ to $C_4$ alkyl group.

2. A resin according to claim 1 prepared by aluminum chloride catalyzed polymerization.

3. A resin according to claim 1 wherein the $C_8$ to $C_{10}$ vinyl aromatic hydrocarbon stream is a distillate fraction from steam cracked aromatic hydrocarbon having a boiling point range of from about 80° C. to about 260° C.

4. The resin according to claim 1 wherein the piperylene stream is present in the hydrocarbon feed in amounts of from about 10% to about 35% by weight.

5. The resin according to claim 1 wherein the piperylene stream is a heat soaked piperylene.

6. The resin according to claim 1 wherein the chain transfer agent stream is present in amounts of from about 45%. to about 65% by weight.

7. The resin according to claim 1 wherein the chain transfer agent stream is a mixture of $C_6$ isomers produced by the dimerization of propylene.

8. The resin according to claim 1 wherein the hydrocarbon feed comprises:
   (a) from about 5 to about 50 parts by weight of styrene, alpha-methyl styrene, or mixtures thereof;
   (b) from about 10 to about 26 parts by weight of a heat soaked piperylene stream; and
   (c) from about 25 to about 70 parts by weight of a mixed $C_6$ olefin stream produced by dimerization of propylene.

9. The hydrocarbon resin of claim 1 having a softening point of from about 15° C. to about 30° C.

10. A petroleum hydrocarbon resin having a softening point of from 10° C. to about 30° C., a Gardner color of 2 or less and a molecular weight distribution of from about 1.1 to about 1.3 with number average molecular weight of from about 350 to about 500; prepared by Friedel Crafts polymerization from a reaction mixture comprising:
 (a) from about 5 to about 50 parts by weight of styrene, alpha-methyl styrene or mixtures thereof;
 (b) from about 10 to about 26 parts by weight of a heat soaked piperylene concentrate; and
 (c) from about 25 to about 70 parts by weight of a stream containing mixed $C_6$ monoolefins resulting from the dimerization of propylene.

* * * * *